3,235,510
EMULSIFIED ANTI-CORROSION COMPOSITION
Lawrence V. Collings, Park Forest, Ill., and David B. Sheldahl, Griffith, Ind., assignors to Sinclair Research, Inc., Wilmington, Del., a corporation of Delaware
No Drawing. Filed Apr. 17, 1962, Ser. No. 188,250
5 Claims. (Cl. 252—395)

The present invention relates to emulsified corrosion inhibiting compositions of improved low temperature storage stability. In another embodiment the present invention relates to emulsified anti-corrosion compositions possessing both low temperature storage stability and a reduced pour point.

Emulsions of oil, sulfonate and water are known to be useful as corrosion inhibitors for automotive cooling systems. Although emulsions of oil, sulfonate and water can be prepared that are stable at room temperatures, when these emulsions are subjected to temperatures below freezing for prolonged periods, as for instance three days, the emulsions upon reaching room temperature are broken and separate into layers. Reagitation of the stratified composition will restore the emulsion but within an hour it again begins to separate into layers.

Obviously, stratification is undesirable in that a stratified product when added to, for instance, an automotive cooling system as a corrosion inhibitor, would not be as reliable as a homogeneous product because the distribution of the sulfonate would not be uniform in the stratified product. In cases, moreover, wherein only a part of the packaged product is added, stratification of that product could mean the omission of a constituent of the product important to the uniform distribution and effectiveness of the sulfonate. Efforts to remedy this problem have not been altogether satisfactory in that, for example, additives commonly employed to stabilize the emulsions have to be used in greater amounts than desirable and/or are toxic in nature. Thus, the advantages of a product that would not stratify even when subjected to temperatures below freezing and which contains no toxic ingredients are self-evident.

It has now been discovered that providing an oil-sulfonate-water emulsion with about 5 to 12%, preferably about 7 to 10%, by weight of a polyhydric alcohol having the structural formula $CH_2OH(CH-OH)_xCH_2OH$ wherein $x=3-4$, results in an emulsion having improved low temperature (i.e. below freezing) stability. Suitable polyhydric alcohols include the 1,2,3,4,5,6-hexanehexols such as sorbitol, mannitol and dulcitol and 1,2,3,4,5-pentanepentols such as arabitol and xybitol. The preferred alcohols are the hexanediols, particularly sorbitol.

In another embodiment, it has been discovered that the addition in minor amounts of the combination of the above-defined polyhydric alcohol with a polyhydric alcohol selected from the group consisting of alkanediols and alkanetriols of 2 to 6 carbon atoms provides an emulsion that not only exhibits low temperature stability but also possesses a reduced pour point. Examples of the diols or triols that may be employed in combination with the 5 or 6 hydroxy group-containing polyhydric alcohols of the present invention include ethylene glycol, propylene glycol, glycerine, hexanetriol, etc. When the combination is employed, less of the

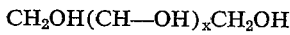
$$CH_2OH(CH-OH)_xCH_2OH$$

polyhydric alcohol (wherein $x=3-4$) need be provided than when used alone and will usually fall in the range of about 3 to 8%, while the diol or triol component is added to the oil-sulfonate-water emulsion in an amount of about 5 to 25% by weight. Preferably when the alkanediol is selected it will usually be present in an amount of about 5 to 10% by weight and when the alkanetriol is selected about 10 to 20% by weight is usually added. The specific amounts employed for optimum results is dependent of course on the particular sulfonate and mineral oil used and the amounts in which they are employed. The weight ratio of diol or triol to the higher polyhydric alcohol will usually be about 1 to 2.5:1, preferably about 1.5 to 2:1.

The aromatic sulfonates useful in this invention are the ammonium and sodium salts of the oil-soluble aromatic sulfonic acids of the benzene or naphthalene series, in which the aromatic ring is sulfonated. In order to impart oil-solubility, the ring preferably also contains one or more alkyl substituents having up to a total of 20 carbon atoms. Such sulfonates can be made by the ammonium hydroxide or sodium hydroxide neutralization of sulfonated aromatic petroleum fractions or aralkyl hydrocarbons such as dinonyl naphthalene, and include neutralized sulfonated bottoms from the manufacture of dodecylbenzene, neolene, etc. fractions. Typical aromatic sulfonates are described for instance in U.S. Patent 2,594,266. They can be obtained by the reaction of ammonia or sodium hydroxide with sulfuric acid-treated hydrocarbon oils. Such mahogany sulfonates possess appreciable solubility in both water and hydrocarbon oils. The sulfonates may be employed as a concentrate in the oil from which they are derived. A typical concentrate for use in this composition has, for example, a sulfonate concentration of about 10% by weight and can be prepared by treating a Mid-Continent neutral oil with four successive dumps of oleum, a total of 120 pounds of the oleum being used for each barrel of oil. Following removal of the separable sludge after the last dump of oleum, the acid oil is blown with air to remove sulfur dioxide and settled to remove substantially the last trace of sludge. Thereafter the oil is mixed with 0.5% by weight of water and neutralized with an excess of anhydrous ammonia or caustic. Finally, the oil is heated to a temperature of 280° F. to dehydrate it, and filtered to obtain the product.

Although the sulfonates are advantageously employed in the oil solution in which they may be prepared, the sulfonates can be recovered by extraction with a low molecular weight alcohol, such as isopropanol or ethanol, followed by distillation for use in the oil-free form. Aniline or a lower molecular weight oil-soluble monohydroxy alcohol, such as isopropanol, is advantageously added to sulfonate solution in small amounts to improve the stability thereof. The aromatic sulfonates comprise about 2 to 10% preferably about 3 to 8%, on dry basis by weight of the composition of the present invention.

The oil of the composition of the present invention is a mineral lubricating oil, preferably having a viscosity of about 200 to 300 SUS at 100° C. and is usually a distillate oil. It may be derived from paraffinic, naphthenic, asphaltic or mixed base crudes and can be a solvent extracted or solvent refined oil obtained in conventional methods of solvent refining lubricating oils. A particularly suitable mineral oil used in the preparation of the composition is a solvent refined Mid-Continent neutral oil having a viscosity of about 205 to 215 SUS at 100° F. The mineral oil constitutes about 30 to 60% by weight of the composition.

The essential balance of the composition of the present invention is water and usually constitutes about 20 to 75%, preferably about 25 to 55%, by weight of the total composition. If desired, other additives such as additional corrosion inhibitors, pour point depressors, emulsifiers, anti-foam agents, etc. may be added to the composition of the invention as long as they do not unduly deleteriously affect the ultimate desired properties.

The emulsion can be easily prepared by first blending together the mineral oil and aromatic sulfonate, preferably including low molecular weight alcohol such as isopropyl alcohol as a stabilizing agent for the sulfonate-oil mixture. An anti-foam agent is preferably then dispersed in the oil-sulfonate blend and this mixture then added to water with rapid stirring. The resulting emulsion is then dispersed in the higher polyhydric alcohol of the present invention or a mixture of the defined combination of higher polyhydric alcohol and diol or triol of the invention, preferably including an anti-foam agent. If employed, the anti-foam agents are added in an amount up to about 0.2% by weight of the total composition.

A specific formulation exhibiting low temperature cold storage stability, for example, would be as follows:

| | Percent |
|---|---|
| Mineral oil | 47.7 |
| Sodium mahogany sulfonate | 5.6 |
| Isopropyl alcohol | 1.1 |
| Anti-foam agent A [1] | 0.1 |
| Anti-foam agent B [2] | 0.5 |
| Sorbitol | 7.0 |
| Water | 38.0 |

[1] Dow Corning silicone Anti-foam A for oil and water (a methylpolysiloxane).
[2] Dow Corning silicone Anti-foam B for water only (a methylpolysiloxane).

A specific formulation exhibiting both low temperature cold storage stability and reduced pour point would be:

| | Percent |
|---|---|
| Mineral oil | 47.7 |
| Sodium mahogany sulfonate | 5.6 |
| Isopropyl alcohol | 1.1 |
| Anti-foam agent A [1] | 0.1 |
| Anti-foam agent B [2] | 0.5 |
| Sorbitol | 3.5 |
| Glycerine or ethylene glycol | 10.0 |
| Water | 31.5 |

[1] Dow Corning silicone Anti-foam A for oil and water (a methylpolysiloxane).
[2] Dow Corning silicone Anti-foam B for water only (a methylpolysiloxane).

The following examples are included to illustrate the advantages of the present invention.

EXAMPLE I

An oil-sulfonate-water emulsion was prepared by first blending 81% of a Mid-Continent neutral oil having a viscosity SUS at 210° F. of 100, 2% isopropyl alcohol, and 17% Petronate (60% sodium mahogany sulfonate in mineral oil). The isopropyl alcohol is added to stabilize the sulfonate-oil mixture. To this blend is added 0.1% of an anti-foam agent. Various emulsions were prepared by first adding the above blend to water using rapid stirring followed by adding this resultant mixture to either Sorbo (70% solution of sorbitol in water), ethylene glycol or glycerine together with 0.5% of an antifoam agent again with rapid stirring. The antifoam agents are added to prevent foaming during formulation. In all cases the oil-sulfonate portion was 55% and the water plus the Sorbo, ethylene glycol or glycerine, totaled 45%. The emulsion stability of the formulation was tested by storage at room temperature for 30 days and low temperature storage at 10° F. for 3 days followed by 27 days storage at room temperature. For comparison, tests were conducted on emulsions to which none of the additive was incorporated. The results of the tests are shown in Table I.

*Table I*

OIL-SULFONATE-WATER EMULSION STABILITIES AFTER 30 DAYS STORAGE

| Additive, percent present | Sorbo* | | Ethylene Glycol | | Glycerine | |
|---|---|---|---|---|---|---|
| | Room Temp. | First 3 days at 10° F. | Room Temp. | First 3 days at 10° F. | Room Temp. | First 3 days at 10° F. |
| None | Excellent [1] | Very poor [2] | | | | |
| 5 | do | Poor [3] | Excellent [1] | Fair [4] | Excellent [4] | Fair.[4] |
| 7.5 | do | Fair [4] | | | | |
| 10 | do | Good [5] | Fair [4] | Fair [4] | Excellent [1] | Fair.[4] |
| 12.5 | do | Excellent [1] | | | | |
| 15 | do | do | Poor [3] | Poor [3] | Good [5] | Good.[5] |
| 20 | Fair [4] | Fair [4] | do | do | Fair [4] | Fair.[4] |

*70% sorbitol in water.
[1] Completely stable emulsion.
[2] Three layers: upper layer, (40%) clear light yellow; middle layer, (20%) white emulsion; bottom layer, (40%) clear dark yellow.
[3] Two layers: upper layer, (60%) white emulsion; lower layer, (40%) opaque light yellow.
[4] Two layers: upper layer, (80%) white emulsion; lower layer, (20%) gray emulsion.
[5] Barely discernible stratification: bottom layer only slightly darker than upper layer.

The data of Table I demonstrate that although small amounts of either sorbitol, ethylene glycol or glycerine offer complete storage stability at room temperature, only the sorbitol is capable of producing completely stable emulsions under low temperature storage.

EXAMPLE II

The pour points of the several of the formulations of Example I were taken and are listed in Table II below. The pour point of the emulsion containing none of the additives is included.

*Table II*

| Additive, Percent Present | Pour Points, ° F. | | |
|---|---|---|---|
| | Sorbo [1] | Ethylene Glycol | Glycerine |
| None | 20 | 20 | 20 |
| 5 | 20 | 20 | 20 |
| 7.5 | 20 | | |
| 10 | 25 | 10 | 10 |
| 15 | 25 | −5 | 0 |
| 20 | 20 | −15 | −20 |

[1] 70% sorbitol in water.

A comparison of Tables I and II shows that sorbitol, although providing cold storage stabilities, does not depress the pour point. The comparative data also show that replacement of part of the water with ethylene glycol or glycerine depresses the pour point but fails to provide the desired room temperature and cold storage stabilities.

EXAMPLE III

Combinations of ethylene glycol or glycerine with sorbitol were added to the oil-sulfonate-water emulsion of Example I and the resulting formulations were subjected to the room temperature and cold storage stability tests of Example I. Tests on the emulsion containing none of the additives and formulations with ethylene glycol alone and glycerine alone are included. The results are shown in Table III.

*Table III*

OIL-SULFONATE-WATER EMULSION STABILITIES AFTER 30 DAYS STORAGE

| Additive, Percent | | | Room Temperature | First 3 Days at 10° F. |
|---|---|---|---|---|
| Sorbo | Ethylene Glycol | Glycerine | | |
| None | None | None | Excellent¹ | Very poor.² |
| ------- | 15 | ---------- | Poor.³ | Poor.³ |
| ------- | ---------- | 15 | Good.⁵ | Good.⁵ |
| 10 | 15 | ---------- | Fair.⁴ | Fair.⁴ |
| 10 | ---------- | 15 | Excellent.¹ | Excellent.¹ |
| 5 | ---------- | 10 | -----do------ | Do. |
| 5 | 10 | ---------- | -----do------ | Do. |

¹ Completely stable emulsion.
² Three layers: upper layer, (40%) clear light yellow; middle layer, (20%) white emulsion; lower layer, (40%) clear dark yellow.
³ Two layers: upper layer, (60%) white emulsion; lower layer (40%) opaque light yellow.
⁴ Two layers: upper layer, (80%) white emulsion; lower layer (20%) gray emulsion.
⁵ Barely discernible stratification: bottom emulsion layer only slightly darker than upper emulsion layer.

EXAMPLE IV

Four points of emulsions containing the combinations of sorbitol-ethylene glycol and sorbitol-glycerine were taken and are listed in Table IV below.

*Table IV*

| Pour, ° F. | Additive, Percent | | |
|---|---|---|---|
| | Sorbo¹ | Ethylene Glycol | Glycerine |
| 25 | 10 | -------------- | -------------- |
| 0 | -------------- | -------------- | 15 |
| -5 | -------------- | 15 | -------------- |
| -20 | 10 | -------------- | 15 |
| -30 | 10 | 15 | -------------- |
| 10 | 5 | -------------- | 10 |
| 5 | 5 | 10 | -------------- |

¹ 70% sorbitol in water.

The data of Tables III and IV show the inclusion of proper amounts of ethylene glycol or glycerine in combination with sorbitol not only provides a formulation having cold storage stability but in addition a reduced pour point.

EXAMPLE V

An oil-ammonium sulfonate-water emulsion giving substantially the same low temperature stability as the oil-sodium sulfonate-water emulsion of Example I was prepared by first adding 2% isopropyl alcohol to the previously mentioned Mid-Continent neutral oil containing 10% ammonium sulfonate. To this blend was added 0.1% of an antifoam agent. The emulsion was prepared by first adding 55 parts of the above blend to 37.5 parts of water with rapid stirring. Thereafter, the resultant mixture was added to a rapidly stirred mixture of 12.5 parts Sorbo (70% solution of sorbitol in water) and 0.5 parts of an antifoam agent.

We claim:
1. A sulfonate-oil-water anti-corrosion emulsion characterized by low temperature storage stability consisting essentially of about 30 to 60% by weight of a mineral lubricating oil, about 2 to 10% by weight of an aromatic sulfonate selected from the group consisting of the sodium and ammonium salts of the oil-soluble aromatic sulfonic acids, about 5 to 12% by weight of a polyhydric alcohol having the structural formula

$$CH_2OH(CH-OH)_xCH_2OH$$

wherein $x=3-4$, with the essential balance being water.
2. The emulsion of claim 1 wherein the amount of said polyhydric alcohol is about 7 to 10% by weight.
3. The emulsion of claim 2 wherein the polyhydric alcohol is sorbitol.
4. The emulsion of claim 3 wherein the aromatic sulfonate is a sodium mahogany sulfonate.
5. A sulfonate-oil-water-anti-corrosion emulsion characterized by both low temperature storage stability and an improved pour point consisting essentially of about 30 to 60% by weight of a mineral oil, about 2 to 10% by weight of an aromatic sulfonate selected from the group consisting of sodium and ammonium salts of the oil-soluble aromatic sulfonic acids, about 3 to 8% by weight of a polyhydric alcohol having the structural formula $$CH_2OH(CH-OH)_xCH_2OH$$

wherein $x=3-4$ and about 5 to 25% by weight of a second polyhydric alcohol selected from the group consisting of alkanediols and alkanetriols of 2 to 6 carbon atoms.

References Cited by the Examiner

UNITED STATES PATENTS 2,338,522  1/1944  Liberthson _____ 252—49.5
3,039,969  6/1962  Colucci et al. _____ 252—49.5

FOREIGN PATENTS 764,922  1/1957  Great Britain.

OTHER REFERENCES

Atlas publication, Atlas Chem. Industries, Inc., Wilmington, Delaware (1962), p. 35.

JULIUS GREENWALD, *Primary Examiner.*